Feb. 16, 1926.
F. J. METZGER
1,573,732
METHOD OF MAKING CALCIUM CYANIDE AND PRODUCT THEREOF
Filed Nov. 23, 1925
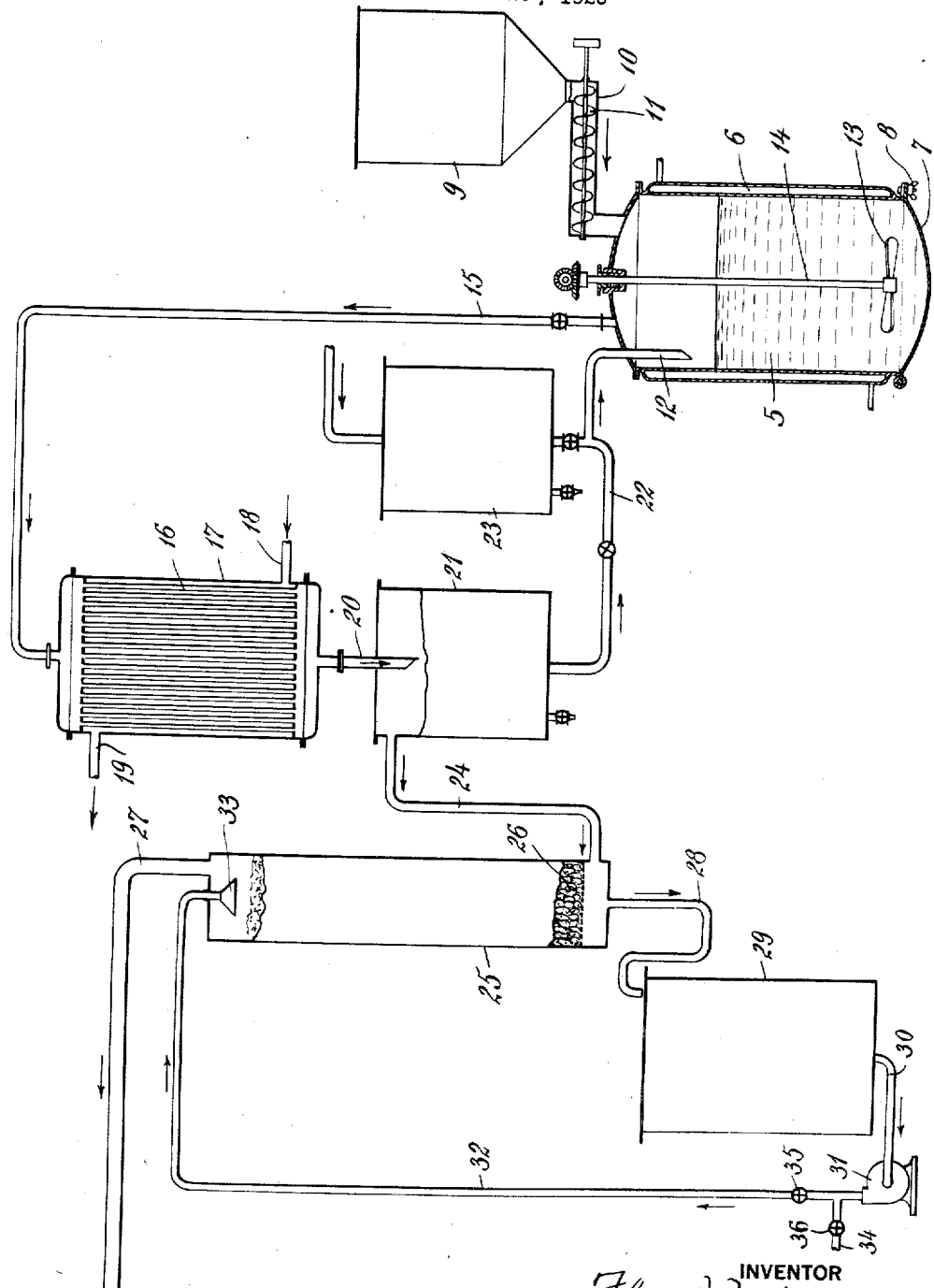
INVENTOR
Floyd J. Metzger
BY
Pennie Davis Marvin & Edmonds
ATTORNEYS Patented Feb. 16, 1926.

1,573,732

UNITED STATES PATENT OFFICE.

FLOYD J. METZGER, OF NEW YORK, N. Y., ASSIGNOR TO CALIFORNIA CYANIDE COMPANY, INC., OF NEW YORK, N. Y., A CORPORATION OF DELAWARE.

METHOD OF MAKING CALCIUM CYANIDE AND PRODUCT THEREOF.

Application filed November 23, 1925. Serial No. 70,914.

*To all whom it may concern:*

Be it known that I, FLOYD J. METZGER, a citizen of the United States, residing at New York city, in the county of New York, State of New York, have invented certain new and useful Improvements in Methods of Making Calcium Cyanide and Product Thereof; and I do hereby declare the following to be a full, clear, and exact description of the invention, such as will enable others skilled in the art to which it appertains to make and use the same.

This invention relates to a method of producing cyanides and to an improved cyanide product.

Various authorities agree that calcium cyanide has never been prepared heretofore in a dry and reasonably pure form. A product called calcium cyanide, which is prepared from calcium cyanamid, is marketed in some cases under the name of sodium cyanide, and in other cases under the name of calcium cyanide, the product being the same in each case; but this product, which contains in the neighborhood of 25% cyanogen, must be regarded as essentially sodium cyanide containing relatively small amounts of calcium cyanide.

It is the object of the present invention to provide a method of preparing substantially pure cyanides and cyanide products and particularly calcium cyanide and products containing calcium cyanide.

Other objects and advantages of the invention will be apparent as it is better understood by reference to the following specification and accompanying drawing, in which a suitable apparatus for applying the method is illustrated diagrammatically.

Hydrocyanic acid has been recognized for a long time as a fumigant of great value and with most widespread applications, for example, in the control of insect and animal pests in citrus and other orchards, in vineyards, in greenhouses, in the various other branches of agriculture, and in storage warehouses, mills, ships, railroad and other vehicles. In spite of the known value of hydrocyanic acid for the purposes mentioned, its widespread application has been greatly retarded, due primarily to the hazards involved in the storage, transportation and methods of application that have been available heretofore.

I have discovered that calcium cyanide of high purity can be made and that the product which I have prepared evolves hydrocyanic acid freely and copiously when exposed to the atmosphere, thus providing a convenient and advantageous source of this valuable and useful agent. Moreover, calcium cyanide, prepared according to my method is a comparatively safe product to store, handle and apply.

In the application of my invention I take advantage of my discovery that calcium carbide reacts with hydrocyanic acid to produce substantially quantitative yields of calcium cyanide $Ca(CN)_2.xHCN$, according to the following reactions:

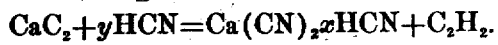

$$CaC_2 + yHCN = Ca(CN)_2.xHCN + C_2H_2.$$

So far as I have been able to determine, the product usually contains two molecules of hydrocyanic acid and corresponds to the formula $Ca(CN)_2.2HCN$. If the calcium carbide is free from contaminating constituents, substantially pure calcium cyanide can be produced by this reaction. Since, however, calcium carbide of a commercial grade is rarely pure, calcium cyanide produced therefrom will contain certain impurities. It is possible, nevertheless, to produce a very high grade of calcium cyanide from good commercial calcium carbide. Such a carbide contains approximately 80% of calcium carbide and it can be made to yield a product containing cyanogen equivalent to 100 or more per cent of calcium cyanide.

In carrying out the reaction, anhydrous liquid hydrocyanic acid can be employed, but in that case the reaction is relatively slow. The introduction of a small amount of water is desirable and from one-half to five per cent of water, calculated on the weight of carbide employed, is effective in catalyzing the reaction. While it is desirable to have a small amount of water present, an excess is to be avoided, because the water reacts with the calcium carbide to produce acetylene and calcium hydroxide, and the yield of pure calcium cyanide is diminished. Since the water acts apparently in the reaction as a catalyst, it is sufficient to provide a small amount of water to insure that the reaction will proceed with comparative rapidity.

The water, which is used preferably to accelerate the reaction, can be introduced with the hydrocyanic acid or otherwise. Thus a bone dry calcium carbide should be treated preferably with hydrocyanic acid, containing from one-half to five per cent. of water, calculated on the weight of carbide employed. The water may be provided, however, by any suitable means. Thus, a substance, or a mixture of substances capable of setting free water under the conditions existing during the reaction, would furnish the water required, provided, of course, that such substance or mixture of substances would not otherwise interfere with the principal reaction. The presence or introduction of oxides or hydroxides of the alkali or alkali earth metals or mixtures of these serves the purpose. Calcium oxide or hydroxide or both are normally present in commercial calcium carbide.

It is desirable to employ calcium carbide in a finely divided state. I have found that a carbide of from 40 to 100 mesh, or even finer, is suitable for the reaction. It is not essential, however, that the calcium carbide be introduced in a pulverized condition. Carbide in lump form can be used provided that it is stirred sufficiently during the reaction to continuously expose fresh surfaces to the action of the hydrocyanic acid. The resultant abrasion will remove the calcium cyanide from the lumps and thus permit the continued attack of the hydrocyanic acid upon the carbide.

The preferred apparatus comprises a reaction vessel having suitable means to permit cooling or heating as desired. The vessel, which should be closed, may have inlets to permit the introduction of the calcium carbide and liquid hydrocyanic acid and should be provided with stirring means to maintain suitable agitation of the material during the reaction. Owing to the fact that one of the reaction products is gaseous acetylene, it is necessary to have an outlet for the gas. A certain amount of hydrocyanic acid as vapor will be carried off by the gas and this may be condensed and returned to the reaction vessel. The acetylene should be scrubbed to remove any hydrocyanic acid which is not condensed. It can be used thereafter for any of the usual purposes for which acetylene is employed.

The reaction may be carried out likewise in a closed apparatus similar to a dough mixer in which the calcium carbide is placed and to which the liquid hydrocyanic acid is supplied at a rate just sufficient to permit reaction with the carbide. In this case the material would be substantially dry during the entire operation and the necessity for drying the product would be avoided. Similarly the operation could be conducted in an apparatus adapted to supply fresh carbide continuously and to apply hydrocyanic acid thereto on the countercurrent principle so that the partially completed product would be caused to react with a fresh supply of liquid hydrocyanic acid while the fresh calcium carbide would combine with that portion of the hydrocyanic acid which escapes reaction with the substantially completed material. Various other types of apparatus can be employed. By conducting the reaction as described, it is possible to produce large quantities of calicum cyanide in various degrees of purity, depending upon the character of the calcium carbide which is employed.

Referring to the drawing in which the preferred apparatus is illustrated, 5 indicates a reaction vessel having a jacket 6 through which heating and cooling agents can be circulated as desired. The vessel is provided preferably with a hinged bottom 7 which is normally secured in closed position by hinged clamp bolts 8. The bottom can be dropped readily to discharge the contents of the vessel.

A hopper 9 is adapted to contain a supply of calcium carbide and is connected to the vessel 5 by a conveyor 10 having a screw 11 therein. A pipe 12 permits the introduction of liquid hydrocyanic acid. The mass of carbide and hydrocyanic acid is agitated by means of a stirrer 13 secured to a shaft 14 which extends through the top of the vessel and is adapted to be driven from any suitable source of power.

The gaseous product of the reaction is withdrawn through a pipe 15 and is delivered to the tubes 16 of a condenser 17, these tubes being surrounded preferably by a cooling medium such as brine which is introduced through an inlet 18 and withdrawn through an outlet 19. The gaseous product with the condensed hydrocyanic acid is delivered by a pipe 20 to a receiver 21 where any liquid hydrocyanic acid separates and from which it is delivered through pipe 22 to a supply receptacle 23 from which the liquid hydrocyanic acid passes through the pipe 12 into the reaction vessel.

The gas escaping from the receiver 21 passes through a pipe 24 to a column 25 and upwardly therein through a mass of inert material 26 over which a dilute solution of caustic soda flows continuously. The caustic soda absorbs any hydrocyanic acid remaining in the acetylene which escapes through an outlet pipe 27 and may be conveyed to any suitable storage receptacle. The caustic soda is delivered from the tower through a pipe 28 forming a seal, into a receiver 29 in which a suitable supply of the solution is maintained. From the receiver the solution passes through a pipe 30 to a pump 31 which returns it through a pipe 32 to a spray 33 at the top of the tower. A waste pipe 34 is connected to the pipe 32 and valves 35 and 36 are provided to permit the discharge of the caustic soda solution when it is sufficiently saturated with hydrocyanic acid. This solution can be evaporated to recover the sodium cyanide which is formed therein.

The following example will serve to illustrate further the nature of my invention, which, however, is not confined to this example and the method of carrying it into practical effect:

I placed in an apparatus provided with suitable means for heating, cooling and agitation, 400 pounds of liquid hydrocyanic acid to which had been added 3 pounds of water. I then introduced during a period of fifteen minutes 100 pounds of calcium carbide which had been ground to a fineness such that substantially all tested through a 40 mesh screen. During the addition of the carbide, the mass was agitated continuously and cold water was conducted through the jacket of the reaction apparatus. Acetylene was given off freely as the carbide was added. The acetylene, which carried with it a considerable amount of hydrocyanic acid vapor, was passed through a condenser cooled with ice water to condense the hydrocyanic acid gas and separate it from the acetylene. When the reaction was substantially complete as indicated by the fact that acetylene gas ceased to be evolved, warm water at approximately 60° C. was substituted for the cold water in the jacket. The time elapsed from the beginning of the introduction of the carbide to the point at which acetylene gas ceased to be perceptibly evolved was forty minutes. After the warm water had been turned into the jacket, evaporation proceeded regularly and rapidly for a period of one hour and forty-five minutes, at which time the product was finished and ready to be discharged. This product was then transferred to tight cans to protect it from atmospheric action. The total weight of the product discharged was 192 pounds and the product had a cyanogen content of 55.4% cyanogen, equivalent to 98% calcium cyanide or 104.4% sodium cyanide. It was substantially free from alkali metal compounds. The material remained substantially white during the greater part of the period of operation, turning then to a very faint tinge of yellow which gradually increased in intensity to the very end of the operation and the product as discharged had a very light yellow shade. The product was in an extremely fine state of division and lent itself readily to dusting operations.

It is understood that this example is by way of illustration only and that variations may be made without departing from the nature of the invention. A product of lower cyanogen content than was produced in the example described may be prepared in a number of ways. For instance, a carbide of low purity may be employed or, furthermore, the reaction may be stopped short of completion, in which case the product would contain, in addition to the calcium cyanide, more or less calcium carbide. Such a product on exposure to air will give off a mixture of hydrocyanic acid and acetylene. Products containing 50% or more of calcium cyanide are thus easily prepared. Inert substances, such as talc, infusorial earth or calcium carbonate, may be added to the product in any suitable manner to produce a finished product with any desired cyanogen content. Furthermore, it is obvious that mixed cyanides may be produced by this reaction. For example, by treating a mixture of caustic soda and calcium carbide with hydrocyanic acid, a mixture of any desired proportions of sodium and calcium cyanide may be produced and at the same time the physical texture of the final product may be varied and controlled.

The product produced by the treatment of calcium carbide with hydrocyanic acid varies in color from nearly white, through yellow or buff shades to the darker shades of brown, depending upon the care which has been exercised in its production, the color being due to the formation of more or less polymerized hydrocyanic acid. The material is powdery in form and is in an extremely fine state of subdivision. The purity of the material will depend largely upon the purity of the carbide employed in its manufacture and the product will, of course, contain such normal impurities as exist in the carbide used, such as carbon, calcium compounds, ferro-silicon and the like.

The product dissolves quickly and completely in water except for such normal insoluble impurities as occur in the carbide employed. Concentrated solutions rapidly darken in color. Aqueous solutions give the characteristic reactions of cyanogen and calcium ions. It is also soluble in ethyl alcohol of approximately 92% strength. Furthermore, it is readily soluble in commercial grades of absolute methyl alcohol. The product is very susceptible to the action of the atmosphere, giving off hydrocyanic acid rapidly and copiously and leaving a powdery residue usually somewhat darker in color than the original material. A characteristic property of the product is its rapid evolution of hydrocyanic acid when exposed to the air. This evolution is so rapid that the hydrocyanic acid vapor may be ignited with a match, when it will burn with a flame.

The invention comprehends the production of cyanogen compounds of other metals, the carbides of which may react with hydrocyanic acid to produce such compounds.

As herein indicated, various types of apparatus may be used in conducting the reac-

I claim:—

1. The method of preparing cyanogen compounds of alkali forming metals, which comprises treating their carbides with hydrocyanic acid.

2. The method of preparing a cyanogen compound of calcium, which comprises treating calcium carbide with hydrocyanic acid.

3. The method of preparing a cyanogen compound of calcium, which comprises treating calcium carbide with liquid hydrocyanic acid.

4. The method of preparing a cyanogen compound of calcium, which comprises treating calcium carbide with hydrocyanic acid in the presence of a small amount of water.

5. The method of preparing a cyanogen compound of calcium, which comprises treating calcium carbide with hydrocyanic acid in the presence of a substance capable of liberating water during the reaction.

6. The method of preparing a cyanogen compound of calcium, which comprises treating calcium carbide with hydrocyanic acid in the presence of a mixture of substances capable of liberating water during the reaction.

7. The method of preparing a cyanogen compound of an alkali forming metal, which comprises treating a mixture of an alkali forming metal carbide and another compound of the metal with hydrocyanic acid.

8. The method of preparing a cyanogen compound of an alkali forming metal, which comprises treating a mixture of an alkali forming carbide and a hydroxide of the metal with hydrocyanic acid.

9. The method of preparing a cyanogen compound of calcium, which comprises treating a mixture of calcium carbide and a metal hydroxide with hydrocyanic acid.

10. The method of preparing a cyanogen compound of calcium, which comprises treating a mixture of calcium carbide and calcium hydroxide with hydrocyanic acid.

11. The method of preparing a cyanogen compound of calcium, which comprises treating calcium carbide with liquid hydrocyanic acid and agitating the mass during the reaction.

12. The method of preparing a cyanogen compound of calcium, which comprises treating calcium carbide with liquid hydrocyanic acid in the presence of a small amount of water and agitating the mass during the reaction.

13. The method of preparing a cyanogen compound of calcium, which comprises treating calcium carbide with liquid hydrocyanic acid, agitating and cooling the mass during the reaction.

14. The method of preparing a cyanogen compound of calcium, which comprises treating calcium carbide with liquid hydrocyanic acid, agitating the mass during the reaction, withdrawing the gaseous products of the reaction and condensing hydrocyanic acid therefrom.

15. The method of preparing a cyanogen compound of calcium, which comprises treating calcium carbide with liquid hydrocyanic acid, agitating the mass during the reaction, withdrawing the gaseous products of the reaction, condensing hydrocyanic acid therefrom and returning the condensed hydrocyanic acid for further use.

16. The method of preparing a cyanogen compound of calcium, which comprises treating calcium carbide with liquid hydrocyanic acid, agitating the mass during the reaction, withdrawing the gaseous products of the reaction, condensing hydrocyanic acid therefrom, returning the condensed hydrocyanic acid for further use and scrubbing the residual gases.

17. The method of preparing a cyanogen compound of calcium, which comprises treating calcium carbide with liquid hydrocyanic acid, agitating the mass during the reaction, withdrawing the gaseous products of the reaction, condensing hydrocyanic acid therefrom, returning the condensed hydrocyanic acid for further use, scrubbing the residual gases and recovering acetylene therefrom.

18. As an article of manufacture, a composition of matter produced by treating a carbide of a metal with hydrocyanic acid.

19. As an article of manufacture, a composition of matter produced by treating a carbide of an alkali forming metal with hydrocyanic acid and containing more than fifty per cent of metal cyanide.

20. As an article of manufacture, a composition of matter containing more than fifty per cent of calcium cyanide.

21. As an article of manufacture, a composition of matter in solid form containing more than fifty per cent of calcium cyanide.

22. As an article of manufacture, a composition of matter in solid form, which contains calcium cyanide, and is substantially free from alkali metal compounds.

23. As an article of manufacture, a composition of matter produced by treating calcium carbide with hydrocyanic acid.

24. As an article of manufacture, a composition of matter produced by treating calcium carbide with hydrocyanic acid and containing more than fifty per cent of calcium cyanide.

25. As an article of manufacture, a composition of matter, which comprises essentially a calcium cyanogen compound in which each atom of calcium is combined with more than two cyanogen radicals.

26. As an article of manufacture, calcium cyanide containing hydrocyanic acid of crystallization.

27. As an article of manufacture, a calcium cyanide compound having the formula $Ca(CN)_2.xHCN$.

28. As an article of manufacture, a calcium cyanide compound having the formula $Ca(CN)_2.2HCN$.

29. As an article of manufacture a composition of matter produced directly in a finely divided condition by the action of hydrocyanic acid upon a metal carbide.

30. As an article of manufacture a composition of matter containing calcium cyanide and produced directly in a finely divided condition by the action of hydrocyanic acid upon calcium carbide.

31. As an article of manufacture a cyanide compound in solid form which is substantially soluble in 92% ethyl alcohol and in commercial absolute methyl alcohol.

32. As an article of manufacture a calcium cyanide compound in solid form which is substantially soluble in 92% ethyl alcohol and in commercial absolute methyl alcohol.

33. As an article of manufacture, a composition of matter which comprises a mixture of inert material with a cyanogen compound of a metal, substantially free from alkali metal compounds.

34. As an article of manufacture, a composition of matter which comprises a mixture of inert material with a cyanogen compound of calcium, substantially free from alkali metal compounds.

35. The process of producing acetylene, which consists in treating a carbide of an alkali forming metal with hydrocyanic acid.

36. The process of producing acetylene, which consists in treating calcium carbide with hydrocyanic acid.

37. As an article of manufacture, a composition of matter capable of readily liberating hydrocyanic acid when exposed to the atmosphere and leaving a residue, after such exposure, which is substantially free from alkali metal compounds.

38. As an article of manufacture, a composition of matter capable of readily liberating hydrocyanic acid when exposed to the atmosphere and leaving a residue, after such exposure, which is non-injurious to plant tissues when the material is used in sufficient quantity for efficient work.

39. As an article of manufacture, a composition of matter produced by treating a commercial carbide of an alkali forming metal with hydrocyanic acid.

40. As an article of manufacture, a composition of matter produced by treating a commercial calcium carbide with hydrocyanic acid.

41. As an article of manufacture, a composition of matter comprising a metallic cyanide free from alkali metal compounds and produced by treating a commercial carbide of an alkali forming metal with hydrocyanic acid.

42. As an article of manufacture, a composition of matter comprising a cyanide of calcium free from alkali metal compounds and produced by treating a commercial carbide of calcium with hydrocyanic acid.

In testimony whereof I affix my signature.

FLOYD J. METZGER.

tially a calcium cyanogen compound in which each atom of calcium is combined with more than two cyanogen radicals.

26. As an article of manufacture, calcium cyanide containing hydrocyanic acid of crystallization.

27. As an article of manufacture, a calcium cyanide compound having the formula Ca(CN)$_2$.$x$HCN.

28. As an article of manufacture, a calcium cyanide compound having the formula Ca(CN)$_2$.2HCN.

29. As an article of manufacture a composition of matter produced directly in a finely divided condition by the action of hydrocyanic acid upon a metal carbide.

30. As an article of manufacture a composition of matter containing calcium cyanide and produced directly in a finely divided condition by the action of hydrocyanic acid upon calcium carbide.

31. As an article of manufacture a cyanide compound in solid form which is substantially soluble in 92% ethyl alcohol and in commercial absolute methyl alcohol.

32. As an article of manufacture a calcium cyanide compound in solid form which is substantially soluble in 92% ethyl alcohol and in commercial absolute methyl alcohol.

33. As an article of manufacture, a composition of matter which comprises a mixture of inert material with a cyanogen compound of a metal, substantially free from alkali metal compounds.

34. As an article of manufacture, a composition of matter which comprises a mixture of inert material with a cyanogen compound of calcium, substantially free from alkali metal compounds.

35. The process of producing acetylene, which consists in treating a carbide of an alkali forming metal with hydrocyanic acid.

36. The process of producing acetylene, which consists in treating calcium carbide with hydrocyanic acid.

37. As an article of manufacture, a composition of matter capable of readily liberating hydrocyanic acid when exposed to the atmosphere and leaving a residue, after such exposure, which is substantially free from alkali metal compounds.

38. As an article of manufacture, a composition of matter capable of readily liberating hydrocyanic acid when exposed to the atmosphere and leaving a residue, after such exposure, which is non-injurious to plant tissues when the material is used in sufficient quantity for efficient work.

39. As an article of manufacture, a composition of matter produced by treating a commercial carbide of an alkali forming metal with hydrocyanic acid.

40. As an article of manufacture, a composition of matter produced by treating a commercial calcium carbide with hydrocyanic acid.

41. As an article of manufacture, a composition of matter comprising a metallic cyanide free from alkali metal compounds and produced by treating a commercial carbide of an alkali forming metal with hydrocyanic acid.

42. As an article of manufacture, a composition of matter comprising a cyanide of calcium free from alkali metal compounds and produced by treating a commercial carbide of calcium with hydrocyanic acid.

In testimony whereof I affix my signature.

FLOYD J. METZGER.

DISCLAIMER 1,573,732.—*Floyd J. Metzger*, New York, N. Y. METHOD OF MAKING CALCIUM CYANIDE AND PRODUCT THEREOF. Patent dated February 16, 1926. Disclaimer filed June 14, 1933, by the assignee, *Air Reduction Company, Incorporated*.

Hereby disclaims claims 33 and 34 of said Letters Patent and the subject matter thereof.

[*Official Gazette July 11, 1933.*]

DISCLAIMER 1,573,732.—*Floyd J. Metzger*, New York, N. Y. METHOD OF MAKING CALCIUM CYANIDE AND PRODUCT THEREOF. Patent dated February 16, 1926. Disclaimer filed June 14, 1933, by the assignee, *Air Reduction Company, Incorporated*.

Hereby disclaims claims 33 and 34 of said Letters Patent and the subject matter thereof.

[*Official Gazette July 11, 1933.*]